United States Patent [19]

Smith

[11] Patent Number: 5,006,797
[45] Date of Patent: Apr. 9, 1991

[54] ELECTROMAGNETIC SENSOR ASSEMBLY

[76] Inventor: William L. Smith, Blue Ridge Overlook, Brevard, N.C. 28712

[21] Appl. No.: 317,967

[22] Filed: Mar. 2, 1989

[51] Int. Cl.$^5$ .......................... G01P 3/48; G01P 3/54; G01B 7/14; G01R 33/00
[52] U.S. Cl. ................. 324/173; 324/207.25; 324/262
[58] Field of Search ............... 324/173, 174, 207, 208, 324/226, 262, 72.5; 73/660, 661

[56] References Cited

U.S. PATENT DOCUMENTS

| | | | |
|---|---|---|---|
| 3,315,163 | 4/1967 | Lutz | 324/72.5 |
| 3,680,379 | 8/1972 | Boyd et al. | 324/174 |
| 3,699,563 | 10/1972 | Cass | 340/268 |
| 3,721,968 | 3/1973 | Gee | 340/195 |
| 3,743,853 | 7/1973 | Dittman | 307/116 |
| 3,764,867 | 10/1973 | Smith | 318/52 |
| 4,028,686 | 6/1977 | Wilson et al. | 340/195 |
| 4,066,949 | 1/1978 | Condrac | 324/207 |
| 4,075,562 | 2/1978 | Karstensen et al. | 324/173 |
| 4,090,091 | 5/1978 | Brown et al. | 307/116 |
| 4,090,099 | 5/1978 | Daffron | 310/168 |
| 4,305,072 | 12/1981 | Makita | 340/870.31 |
| 4,355,364 | 10/1982 | Gudat | 364/565 |
| 4,463,289 | 7/1984 | Young | 318/52 |
| 4,609,869 | 9/1986 | Metcalf | 324/208 |
| 4,665,740 | 5/1987 | Matsumoto et al. | 73/116 |

Primary Examiner—Walter E. Snow
Attorney, Agent, or Firm—Rhodes, Coats & Bennett

[57] ABSTRACT

An improved sensor assembly for providing an electrical signal representative of the velocity of a movable body. The assembly includes a sensor for sensing the velocity of the body and providing the signal and a mounting block disposed close to the body for locating the sensor in a predetermined position with respect to the body. The mounting block has a passageway extending through the block for receiving the sensor and for restricting the movement of the sensor along a direction co-existent with respect to the longitudinal axis of the sensor. The sensor itself includes an elongated barrel portion having a sensing tip in one end. The elongated barrel portion includes a shoulder stop located along the elongated barrel portion at a predetermined position from the end of the elongated barrel portion having the sensing tip. The assembly further includes a nosepiece attached to the mounting block which abuts against the shoulder stop of the sensor, thereby restricting the movement of the sensor along the direction co-existent with respect to the longitudinal axis of the sensor to a predetermined position from the body. Thus, once the mounting block has been initially installed, the sensor itself can be replaced without the necessity for recalibrating the sensor assembly.

11 Claims, 2 Drawing Sheets

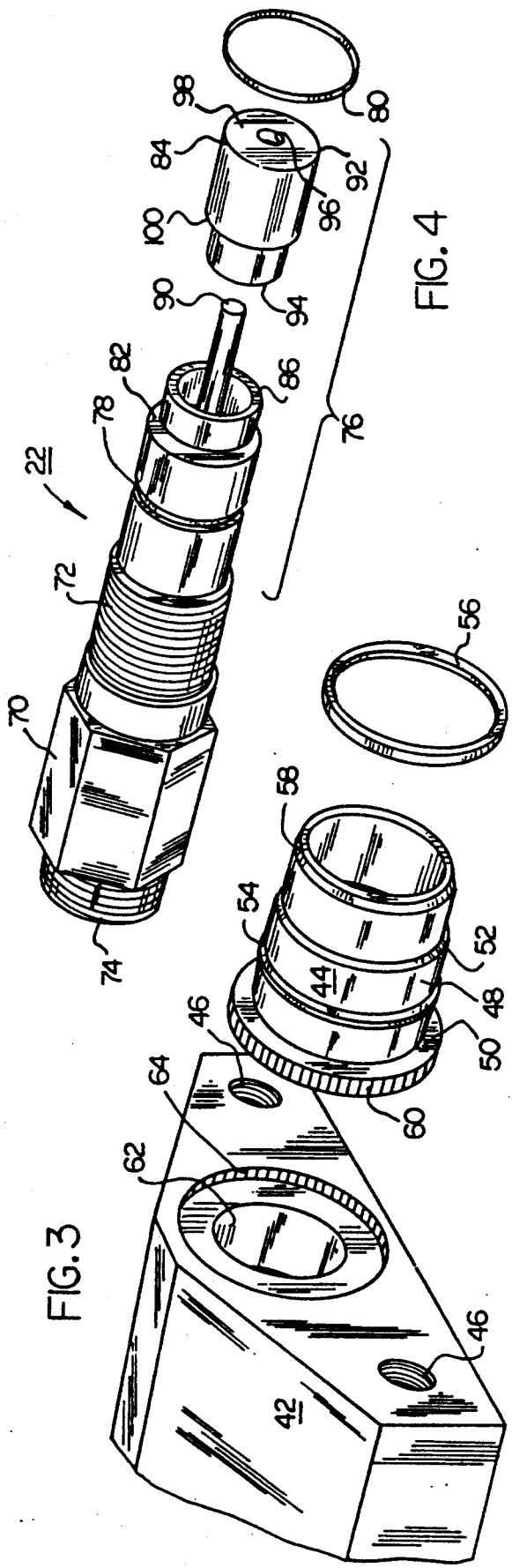
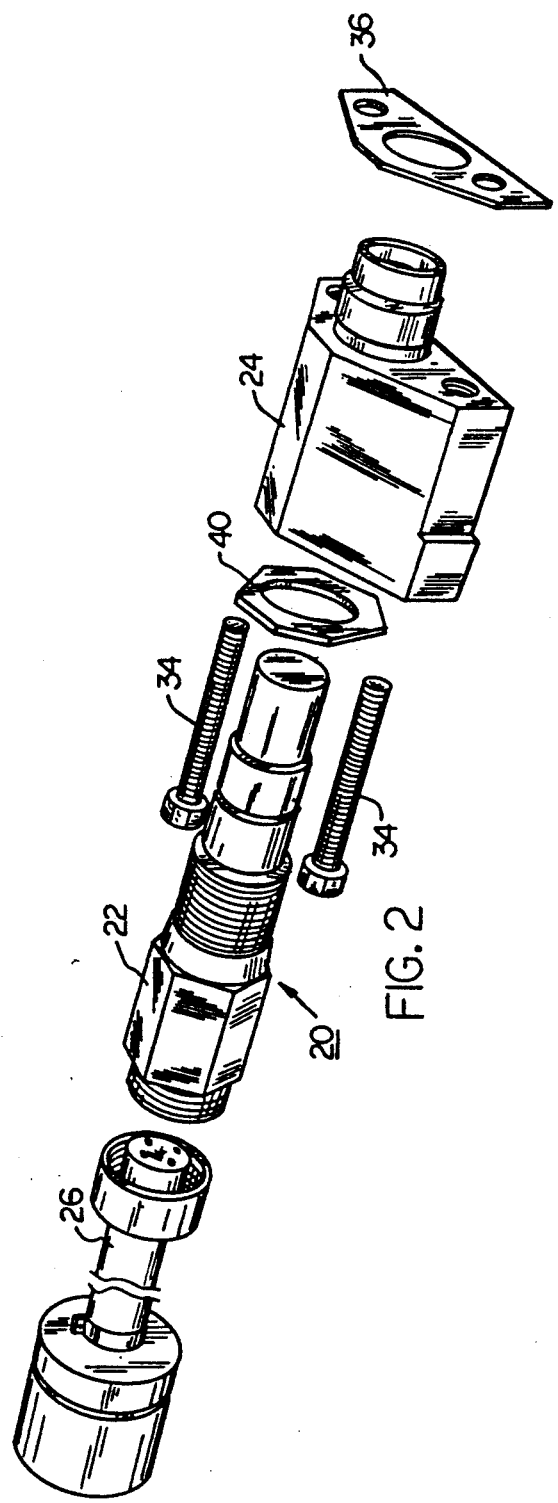

ELECTROMAGNETIC SENSOR ASSEMBLY

BACKGROUND OF THE INVENTION

1) Field of the Invention

The present invention relates generally to an apparatus for sensing the velocity of metallic parts such as gears and, in particular, to a modular sensor assembly for such an apparatus.

2) Description of the Prior Art

In order to control the acceleration or deceleration of a wheeled vehicle, such as a car, truck or diesel locomotive, it is necessary that the speed of the wheel be measured either directly or indirectly. In either accelerating or decelerating control systems, it is desirable to apply power or brakes to the driving wheels in such a manner that the wheels are on the verge of slipping or breaking loose at all times. Indirect velocity measuring systems have not proven satisfactory because of varying road surface conditions and changes in the coefficient of friction between the wheel surfaces and the road.

A number of prior art devices and techniques have been used to measure the speed of the drive wheels either directly by measuring the speed of the drive gear. These include Hall effect, elecromagnetic and optical devices. Because of the cost of the Hall effect devices and the need for a clean environment for the optical devices, electric electromagnetic sensors have usually been the choice. One such sensor assembly suitable for use with such a control system is disclosed in U.S. Pat. No. 3,721,968 issued to Gee, the entire specification of which is hereby incorporated by reference.

However, a number of practical disadvantages have plagued such electromagnetic sensors. First, the electromagnetic sensor is sensitive to spacing variations between the sensor and the moving part. Second, the signal strength is dependent on the speed of the moving part and very low speeds may render the sensor signal useless. However, with the advent of integrated digital circuits, it has now become possible to measure near zero speeds. However, the problem of sensitivity to spacing variations remains.

There are three major sources of spacing variations between the sensor assembly and the moving part. First, the moving part or gear itself is often not concentric. For example, variations of 20–50 mils would be typical. Second, there will be variation in the dimensions of the sensor itself also due to practical manufacturing restraints. Third, installation of the sensor assembly itself by a technician may also introduce dimensional errors. Thus, it has been the common practice to individually assemble and calibrate each sensor during manufacture. Once in the field, the technician then may find it necessary to insert shim spacers between the housing and the traction gear box to compensate for idiosyncrasies of that particular unit. As a result, installation of a new or replacement speed sensor assembly often requires up to 8 hours to install.

It has thus become desirable to develop a speed sensor assembly for a velocity control system that will be suitable for use with such a system while, at the same time, eliminating the prior art problems of recalibration and the expense each time the sensor must be replaced.

SUMMARY OF THE INVENTION

The present invention solves the aforementioned problems associated with the prior art by providing a sensor assembly for providing an electrical signal representative of the velocity of a movable body, which includes a sensor for sensing the velocity of the body and providing the signal and a mounting block disposed close to the body for locating the sensor in a predetermined position with respect to the body. The mounting block has a passageway extending through the block for receiving the sensor and for restricting the movement of the sensor along a direction coexistent with respect to the longitudinal axis of the sensor. The sensor itself includes an elongated barrel portion having a sensing tip in one end. The elongated barrel portion includes a shoulder stop located along the elongated barrel portion at a predetermined position from the end of the elongated barrel portion having the sensing tip. The assembly further includes a nosepiece attached to the mounting block which abuts against the shoulder stop of the sensor, thereby restricting the movement of the sensor along the direction coexistent with respect to the longitudinal axis of the sensor to a predetermined position from the body.

Accordingly, one aspect of the present invention is to provide a sensor assembly which provides an electrical signal representative of the velocity of a movable body including a sensor for sensing the velocity of the body and providing the signal and mounting means disposed close to the body for locating the sensor in a predetermined position with respect to body, thereby eliminating the necessity of recalibrating the sensor assembly each time the sensor is replaced.

Another aspect of the present invention is to provide a sensor for a sensor assembly which provides an electrical signal representative of the velocity of a movable body having a plurality of individual elements equidistantly disposed thereupon to a velocity control system for controlling the velocity of the body, the sensor assembly further including mounting means disposed close to the body for receiving the sensor. The sensor includes an elongated barrel portion including means for restricting the movement of the sensor along a direction coexistent with respect to the longitudinal axis of the sensor to a predetermined position with respect to the mounting means.

Still another aspect of the present invention is to provide a sensor assembly which proves an electrical signal representative of the velocity of a movable body contained in a housing having an aperture for receiving said sensor assembly and having a plurality of individual elements equidistantly disposed thereupon to a velocity control system for controlling the velocity of the body including sensor means including an elongated barrel portion having a sensing tip in one end for sensing the velocity of the body and providing said signal and mounting means disposed close to the body for receiving said sensor means and for locating said sensor means in a predetermined position with respect to said body, thereby eliminating the necessity of recalibrating the sensor assembly each time the sensor is replaced.

These and other aspects of the present invention will be more clearly understood after review of the following description of the preferred embodiment of the invention when considered with the drawings.

BRIEF DESCRIPTION OF THE DRAWINGS

FIG. 2 is an exploded view of the speed sensor assembly shown in FIG. 1;

FIG. 3 is an exploded view of the mounting block sub-assembly shown in FIG. 2;

FIG. 4 is an exploded view of the sensor subassembly shown in FIG. 2;

DESCRIPTION OF THE PREFERRED EMBODIMENTS

Figure 1:
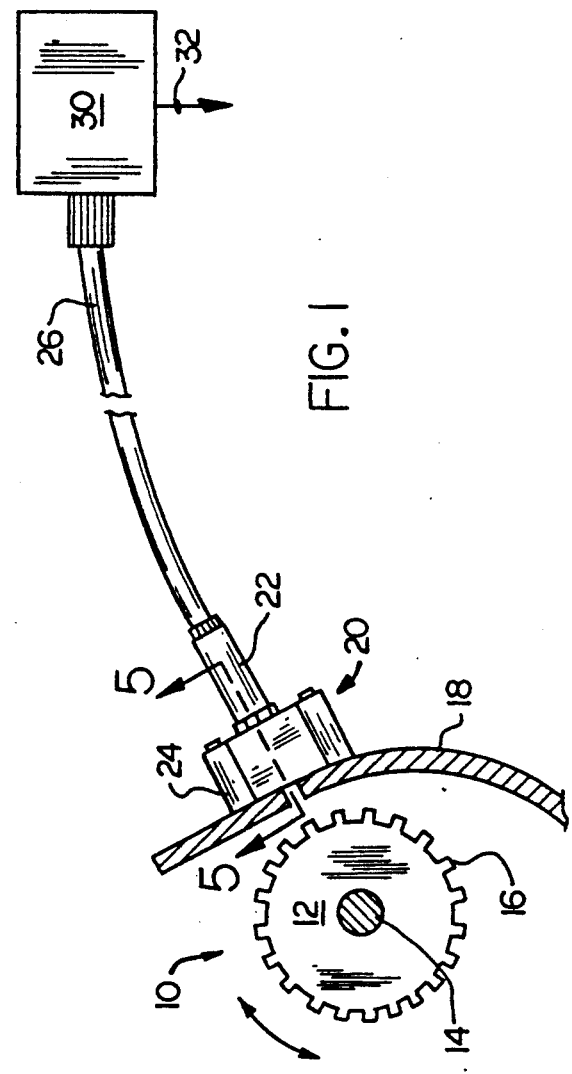
FIG. 1 is a diagrammatic view of a wheel speed control system illustrating the location of the sensor assembly of the present invention.

Referring now to the drawings in general, and FIG. 1 in particular, it will be understood that the illustrations are for the purpose of describing the preferred embodiment of the invention and are not intended to limit the invention thereto. As best seen in FIG. 1, a speed control system suitable for use for controlling the speed of a wheel or a traction motor, generally designated 10, is shown utilizing the sensor assembly of the present invention. For this particular application, gear 12 is mounted on shaft 14 and is operable to rotate in either counterclockwise or clockwise fashion. Gear 12 includes a plurality of gear teeth 16 and is mounted within traction motor housing 18. Speed sensor assembly 20 is affixed to the outer surface of traction motor housing 18. Speed sensor assembly 20 includes three sub-assemblies: a sensor sub-assembly 22; a mounting block sub-assembly 24; and a shielded cable/connector sub-assembly 26. Sensor sub-assembly 22 extends through an aperture in the wall of traction motor housing 18 and is in close proximity to gear teeth 16. The output of speed sensor assembly 20 is connected to a control circuit 30. Control circuit 30 is conventional in design and provides a control signal 32 in response to the input from speed sensor assembly 20. Control signal 32 may be utilized to increase or decrease speed of the driving motor, engage or disengage braking, or otherwise control the speed of the vehicle. Thus, the speed sensor assembly 20 of the present invention, as provided herein, is used to directly monitor a moving part in the motor drive system, such as a gear 12, in order to provide a signal representative of the speed of rotation of that part. In turn, control circuit 30 utilizes the speed signal to accurately control the speed of the vehicle within predetermined limits, thereby improving vehicle performance.

Referring to FIG. 2, an exploded view of the speed sensor assembly 20, is shown. As previously mentioned, speed sensor assembly 20 includes three subassemblies. Mounting block sub-assembly 24 is mounted to traction motor housing by means of bolts 34. One or more shim spacers 36 may be inserted in the innerface between mounting block 24 and housing 18 in order to increase or decrease the spacing of the tip of the sensor sub-assembly 22 and teeth 16 of gear 12. The sensor sub-assembly 22 is threaded into the back of mounting block sub-assembly 24 and, once in position, is locked into place by means of jam-nut 40. One end of cable/connector sub-assembly 26 is connected to the output of sensor sub-assembly 22. The other end of cable/connector sub-assembly 26 is connected to control circuit 30. One such shield and armored cable particularly suitable for use with the present invention is Part No. 260158, available from Smith Systems, Inc., Brevard, NC. Thus, speed sensor assembly 20 consists of a three-piece modular design that will allow replacement of any one of the three basic components of the assembly without having to replace all the parts of the assembly. In particular, the removable sensor allows the user to replace a faulty sensor sub-assembly 22 without concern for the gap between the sensing tip of sensor sub-assembly 22 and teeth 16 of gear 12, as will be discussed below.

Referring now to FIG. 3, an exploded view of mounting block sub-assembly 24 is shown. Mounting block sub-assembly 24 includes a main block portion 42 and nosepiece 44. In the preferred embodiment, block 42 and nosepiece 44 are machined from nonmagnetic stainless steel. A plurality of mounting holes 46 extend through main block 42 for receiving bolts 34 therethrough. Nosepiece 44 includes a barrel portion 48 and a base portion 50. Barrel portion 48 may include a shoulder region 52 which would be dependent on the geometry of the receiving aperture of the traction motor housing (not shown). In the preferred embodiment, barrel portion 48 also includes a receiving groove 54 cut along its perimeter for receiving O-ring 56. Groove 54 and O-ring 56 provide a lube seal with respect to housing 18, thereby preventing leakage of oil from housing 18 past the outer surface of nosepiece 44. In addition, the outer edge 58 of the end of barrel portion 48 opposite the base 50 may be chamfered slightly to remove burrs and to facilitate insertion into the aperture of housing 18. A knurled ring 60 extends along into the outer perimeter of base 50 to facilitate welding base 50 to main block 42. An aperture 62 extends through main block 42 for receiving sensor sub-assembly 22. Counter-sunk bore 64 is concentric with centerline of aperture 62 and is sized to receive base 50. As will best be seen in the following figures, the inner diameter of tubular barrel portion 48 is smaller than the diameter of aperture 62 thereby cooperating with sensor sub-assembly 22 to provide a stop function against the bottom surface of base 50, thereby allowing the sensor sub-assembly 22 to be self-locating.

Turning next to FIG. 4, an exploded view of the sensor sub-assembly 22 is shown. Sensor sub-assembly 22 includes a circuit board housing 70 having a first threaded portion 72 on one end for engaging the mounting block sub-assembly 24 and a second threaded portion 74 housing an integral connector (not shown) for engaging with cable/connector sub-assembly 26. Sensor subassembly 22 also includes a barrel portion 76. Barrel portion 76 includes a groove 78 around the perimeter of the mid-section for receiving O-ring 80 to provide a lubrication seal with the inner surface of aperture 62. Thus, O-rings 56 and 80 eliminate both paths for oil to travel from housing 18. Barrel portion 76 includes a hard shoulder 82 to provide a positive stop function when contacting the bottom surface of base 50 of nosepiece 44.

The dimension between hard shoulder 82 and the end of barrel portion 76 is critical in order to provide interchangeability and repeatability of replacement sensor sub-assembly 22 without the need for removing and probably reshimming mounting block sub-assembly 24. Accordingly, in the preferred embodiment, barrel portion 76 includes a secondary transducer housing to mate with cylindrical portion 86 and is concentric with sensor tip 90. Secondary transducer housing 84 includes a first diameter portion 92 and a second diameter portion 94. The outer diameter of second diameter portion 94 is slightly less than the inner diameter of cylindrical portion 86. The outer diameter of first diameter portion 92 is substantially the same as the outer diameter of cylindrical portion 86. The secondary transducer housing 84 includes end wall 98 having an aperture 96 for receiving sensor tip 90. The secondary transducer housing 84 may be welded to barrel portion 76 or otherwise suitably attached. The overall dimension of the secondary transducer housing is closely controlled with respect to hard shoulder 84 such that dimensions from end wall 98 and to hard shoulder 82 fall within plus or minus 5 mils.

Figure 5:
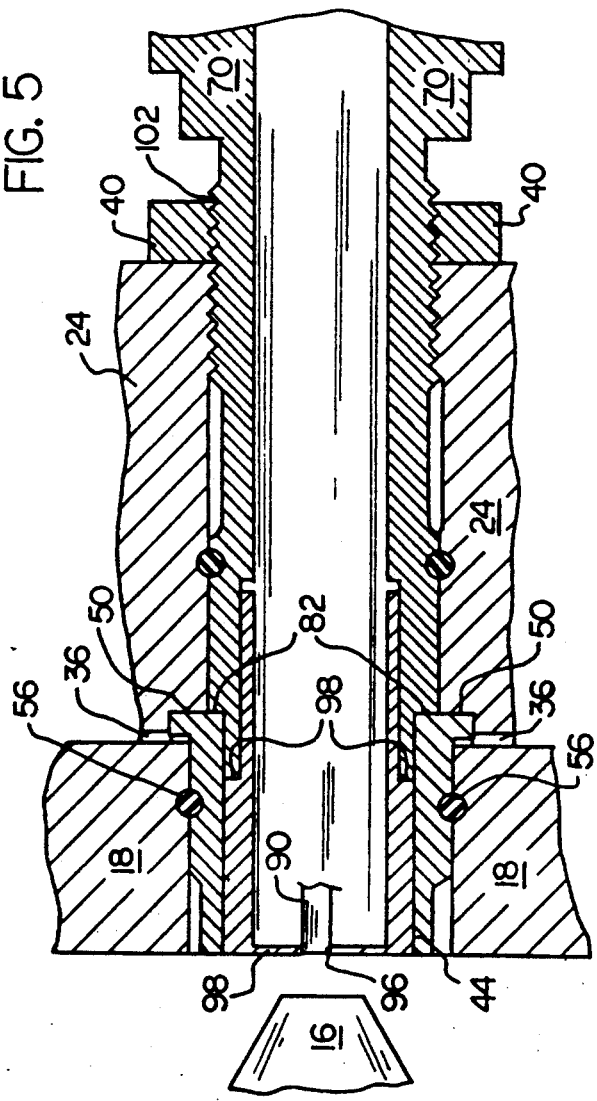
FIG. 5 is a longitudinal sectional view of the sensor assembly of FIG. 1 taken along line 5—5.

As best seen in FIG. 5, a longitudinal sectional view of the sensor assembly 20 illustrates the cooperation between the nosepiece 44, main block 42 and the hard shoulder 82 of sensor sub-assembly 22. As a result, once mounting block sub-assembly 22 has been installed and calibrated with a sensor sub-assembly 22, sensor sub-assembly 22 can be replaced without the need for reshimming mounting block sub-assembly 24, since the combination of the hard shoulder 82 of sensor sub-assembly 22 against the bottom surface of base 50 of nosepiece 44 provides a means for precisely reproducing the gap between the sensor tip 90 and the surface of tooth 16.

Thus, in operation, speed sensor assembly 20 is installed with respect to traction motor housing 18 in a conventional manner using shim spacers 36 if necessary to control the spacing between the sensor tip 90 and gear teeth 16. Once properly aligned, bolts 34 are tightened down and the mounting block sub-assembly 22 becomes permanently or semi-permanently attached to traction motor housing 18. If, during subsequent operations, sensor subassembly is damaged or otherwise becomes inoperable, jam-nut 40 is first loosened and then sensor subassembly assembly 22 may be backed out of mounting block subassembly assembly 24. A new sensor sub-assembly 22 may then be threaded into mounting block sub-assembly 24 until hard shoulder 82 contacts the positive stop formed by the bottom of base 50. Either a new or existing cable/connector sub-assembly 26 is attached to threaded portion 74 of the sensor sub-assembly. No additional calibration or recalibration is necessary. Thus, the previously arduous task of replacing a speed sensor assembly is eliminated after an initial installation. In addition, a sensor sub-assembly 22 and the cable/connector assembly 26 may be replaced independently of each other without having to replace the entire sensor assembly. Thus, there is savings of materials as well as labor and downtime.

Certain modifications and improvements will occur to those skilled in the art upon reading of the foregoing description. By way of example, nosepiece 44 and main block 42 could be machined from a single block. Furthermore, the barrel portion of nosepiece 44 can be eliminated for some applications not requiring an oil seal or a protective cylinder around the sensing tip. In addition, while nonmagnetic stainless steel is utilized as materials of construction for the sensor subassembly, other materials could be equally suitable. It should be understood that all such modifications and improvements have been deleted herein for the sake of conciseness and readability and are properly within the scope of the following claims.

I claim:

1. A sensor assembly for providing an electrical signal representative of the velocity of a movable body, comprising:
   (a) sensor means for sensing the velocity of the body and providing said signal; and
   (b) mounting means disposed close to the body for locating said sensor means in a predetermined position with respect to said body, wherein said mounting means includes a mounting block having a passageway extending through said block for receiving said sensor means, first means for restricting the movement of said sensor means along a direction coexistent with respect to the longitudinal axis of said sensor means and second means for restricting the movement of said sensor means along the direction coexistent with respect to the longitudinal axis of said sensor means to a predetermined position from said body, wherein said second means for restricting the movement of said sensor means along the direction coexistent with respect to the longitudinal axis of said sensor means to the predetermined position from said body include a base plate having an aperture coexistent with the longitudinal axis of said sensor means, said aperture being sized to permit a predetermined portion of said sensor means to extend therethrough, wherein said base plate having an aperture coexistent with the longitudinal axis of said sensor means includes an elongated tubular portion having one end attached to said base plate, said barrel portion extending along the direction coexistent with respect to the longitudinal axis of said sensor means and being sized to permit at least a portion of said sensor means to extend therein.

2. The apparatus according to claim 1, wherein said first means for restricting the movement of said sensor means along the direction co-existent with respect to the longitudinal axis of said sensor means include complementary threaded portions along said sensor means and said passageway for engaging one another, said threaded portions being substantially concentric with respect to the longitudinal axis of said sensor means.

3. The apparatus according to claim 1, wherein said barrel portion includes sealing means disposed along the perimeter of said barrel portion for forming a seal with the housing aperture.

4. The apparatus according to claim 1, wherein said mounting means includes means for affixing said mounting block in a position adjacent to said moving body.

5. A sensor assembly for providing an electrical signal representative of the velocity of a movable body contained in a housing having an aperture for receiving said sensor assembly and having a plurality of individual elements equidistantly disposed thereupon to a velocity control system for controlling the velocity of the body, comprising:
   (a) sensor means including an elongated barrel portion having a sensing tip in one end for sensing the velocity of the body and providing said signal, said elongated barrel portion including first means for restricting the movement of said sensor means along a direction co-existent with respect to the longitudinal axis of said sensor means to a predetermined position with respect to said body and second means for restricting the movement of said elongated barrel portion along a direction co-existent with respect to the longitudinal axis of said elongated barrel portion, said first means for restricting the movement of said sensor means along a direction co-existent with respect to the longitudinal axis of said sensor means to a predetermined position with respect to said body being located between said sensing tip and said second means for restricting the movement of said elongated barrel portion along a direction co-existent with respect to the longitudinal axis of said elongated barrel portion; and (b) mounting means disposed close to the body for receiving said sensor means; and for locating said sensor means in a predetermined position with respect to said body, wherein said mounting means includes a mounting block having a passageway extending through said block for receiving said sensor means, first means for restricting the movement of said sensor means along a direction co-existent with respect to the longitudinal axis of said sensor means and second means for restricting the movement of said sensor means along the direction co-existent with respect to the longitudinal axis of said sensor means to a predetermined position from said body, wherein said second means for restricting the movement of said sensor means along the direction co-existent with respect to the longitudinal axis of said sensor means to the predetermined position from said body include a base plate having an aperture co-existent with the longitudinal axis of said sensor means, said aperture being sized to permit a predetermined portion of said sensor means to extend therethrough, wherein said base place having an aperture co-existent with the longitudinal axis of said sensor means includes an elongated tubular barrel portion having one end attached to said base plate, said barrel portion extending along the direction co-existent with respect to the longitudinal axis of said sensor means and being sized to permit at least a portion of said sensor means to extend therein.

6. The apparatus according to claim 5, wherein said third means for restricting the movement of said sensor means along the direction co-existent with respect to the longitudinal axis of said sensor means include complementary threaded portions along said sensor means and said passageway for engaging one another, said threaded portions being substantially concentric with respect to the longitudinal axis of said sensor means.

7. The apparatus according to claim 5, wherein said barrel portion includes sealing means disposed along the perimeter of said barrel portion for forming a seal with the housing aperture.

8. The apparatus according to claim 5, wherein said mounting means includes means for affixing said mounting block in a position adjacent to said moving body.

9. The apparatus according to claim 5, wherein second means for restricting the movement of said elongated barrel portion along the direction co-existent with respect to the longitudinal axis of said elongated barrel means include complementary threaded portions along said sensor and said mounting means for engaging one another, said threaded portions being substantially concentric with respect to the longitudinal axis of said elongated barrel portion.

10. The apparatus according to claim 5, wherein said first means for restricting the movement of said elongated barrel portion along the direction co-existent with respect to the longitudinal axis of said elongated barrel portion to a predetermined position with respect to said mounting means includes a shoulder stop located along said elongated barrel portion at a predetermined position from the end of said elongated barrel portion having the sensing tip.

11. The apparatus according to claim 10, wherein said elongated barrel portion includes sealing means disposed along the perimeter of said elongated barrel portion for forming a seal with said mounting means.

* * * * *